United States Patent [19]
Henshall

[11] Patent Number: 6,033,029
[45] Date of Patent: *Mar. 7, 2000

[54] AIRPLANE PASSENGER AND LAP CHILD RESTRAINT SYSTEM WITH FLOATATION PAD

[76] Inventor: Charles A. Henshall, 1204 Lawrence Ave., Lawrence, Kans. 66049-4431

[*] Notice: This patent is subject to a terminal disclaimer.

[21] Appl. No.: 09/191,771

[22] Filed: Nov. 13, 1998

Related U.S. Application Data

[63] Continuation-in-part of application No. 09/167,678, Oct. 7, 1998, which is a continuation-in-part of application No. 09/058,640, Apr. 10, 1998, Pat. No. 5,909,927.

[51] Int. Cl.$^7$ .......................... A62B 35/00; A47D 15/00; B60R 21/00; B60R 22/12
[52] U.S. Cl. .......................... 297/468; 297/464; 297/485; 297/463.2; 280/801.1; 441/88; 441/113; 441/119
[58] Field of Search ...................................... 297/468, 464, 297/465, 485, 482, 463.2; 280/801.1; 441/80, 83, 88, 106, 107, 119, 122, 123, 108, 113

[56] References Cited

U.S. PATENT DOCUMENTS

| | | | |
|---|---|---|---|
| 2,802,222 | 8/1957 | Chapman | 441/113 |
| 2,950,489 | 8/1960 | Pattison | 441/113 |
| 3,094,725 | 6/1963 | Martin, Jr. | 441/113 |
| 3,137,015 | 6/1964 | Lindeman | 441/113 |
| 3,733,631 | 5/1973 | Cohn | 441/113 |
| 4,026,245 | 5/1977 | Arthur . | |
| 4,234,229 | 11/1980 | Arnold | 297/465 X |
| 4,758,048 | 7/1988 | Shuman | 297/468 |
| 4,787,677 | 11/1988 | Reighter | 297/464 |
| 5,000,710 | 3/1991 | Bedortha et al. | 441/113 X |
| 5,131,682 | 7/1992 | Reed | 280/801.1 |
| 5,348,505 | 9/1994 | Rothhammer | 441/119 X |
| 5,628,548 | 5/1997 | Lacoste | 297/485 X |
| 5,690,525 | 11/1997 | Bing | 441/88 X |
| 5,836,656 | 11/1998 | Baggott | 297/468 |
| 5,909,927 | 6/1999 | Henshall | 297/468 |

FOREIGN PATENT DOCUMENTS

| | | | |
|---|---|---|---|
| 3342594 | 6/1985 | Germany | 297/468 |

*Primary Examiner*—Jose V. Chen
*Assistant Examiner*—Rodney B. White
*Attorney, Agent, or Firm*—Shook, Hardy & Bacon LLP

[57] ABSTRACT

An airplane passenger restraint system is provided that cooperates with an existing seat belt of an airplane seat where the seat belt has two straps which are releasably coupled together. The existing airline seat is typically equipped with an existing seat belt having a first female buckle end and a first male buckle end. The system includes a second male buckle end for mating connection to the first female buckle end of the seat belt and a second female buckle end for mating and releasable connection to the first male buckle end of the seat belt. A first passenger strap is coupled to the second male buckle end and the second female buckle end and extends therebetween. A second passenger strap is coupled to the second male buckle end and the second female buckle end and also extends therebetween. The system further includes a floatation tube secured around the second passenger strap. In use, the first and second passenger straps may be coupled to the existing seat belt to secure an adult and an infant within the airline seat. The floatation tube provides a floatation device for the infant in the event of a water landing.

10 Claims, 3 Drawing Sheets

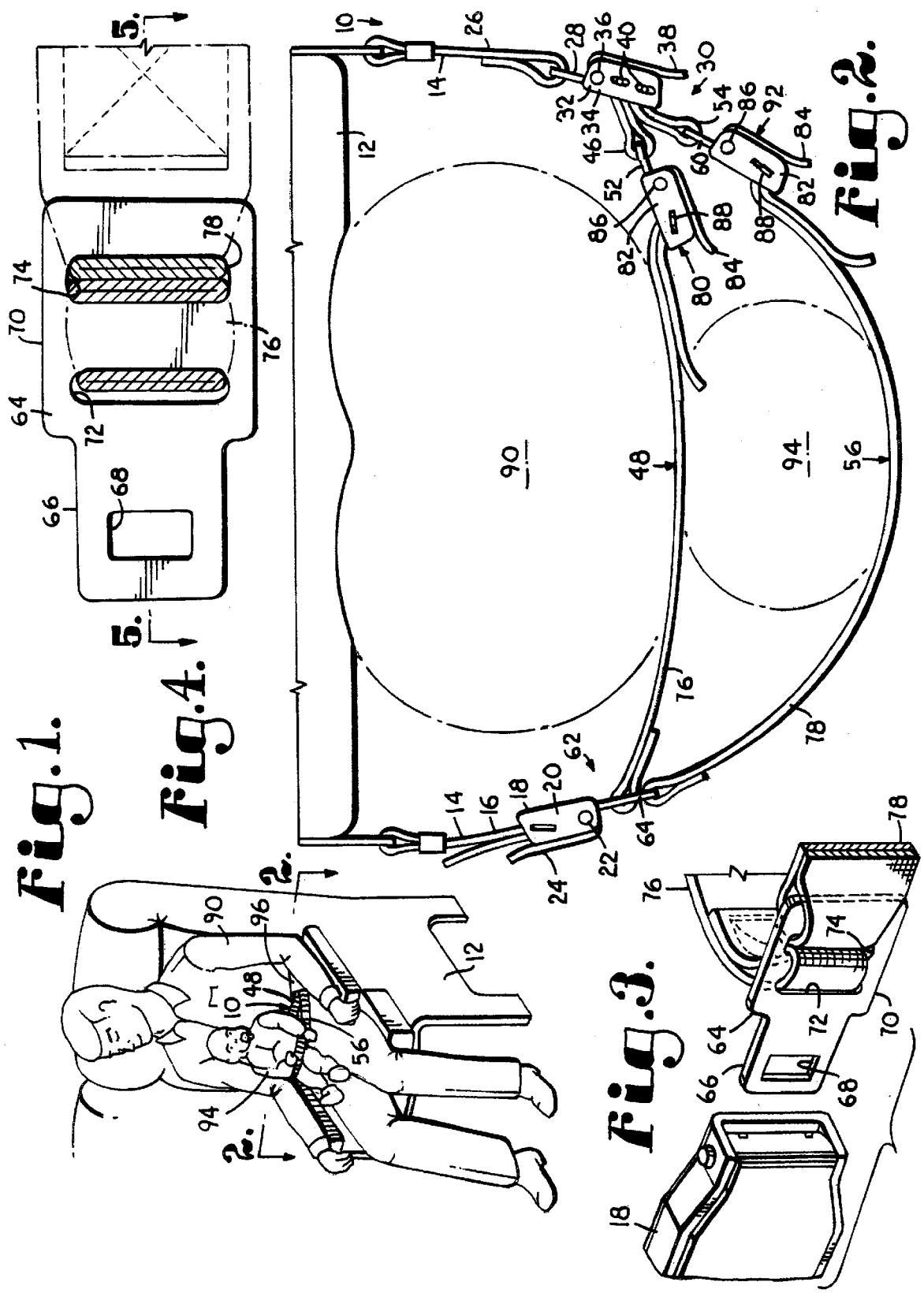

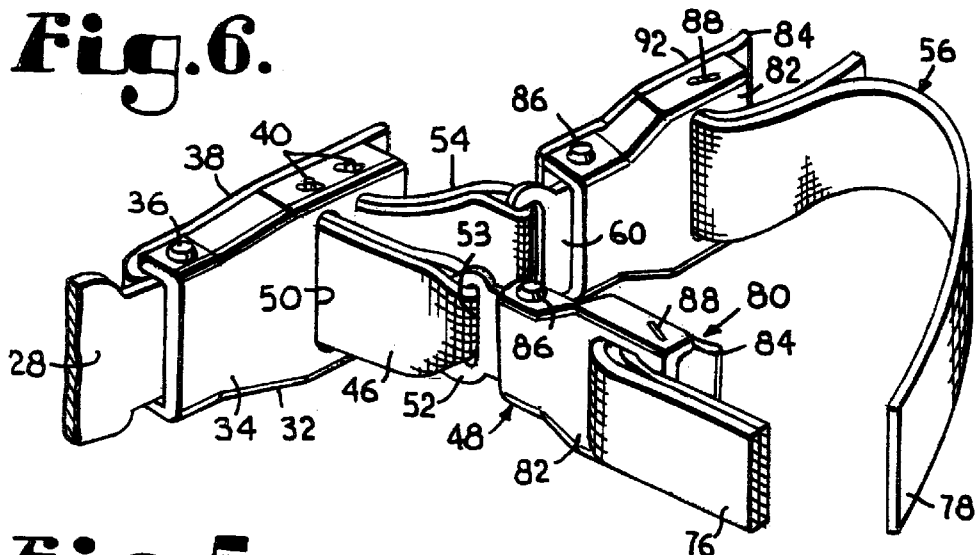
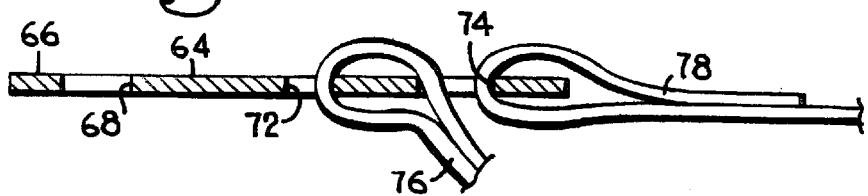
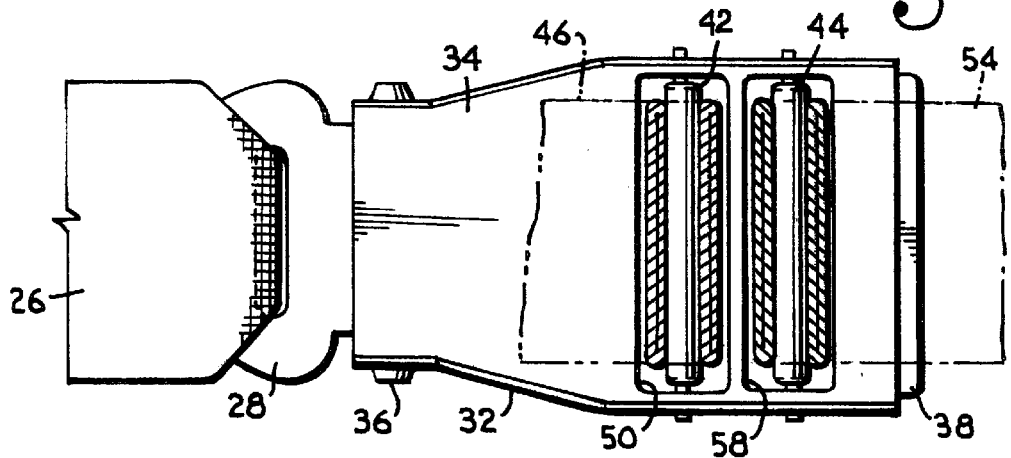
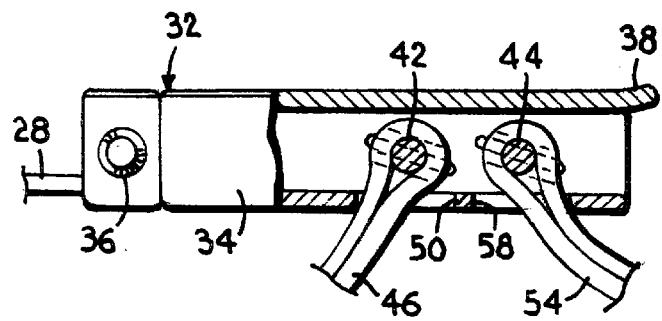

6,033,029

AIRPLANE PASSENGER AND LAP CHILD RESTRAINT SYSTEM WITH FLOATATION PAD

CROSS REFERENCE TO RELATED APPLICATIONS

This application is a continuation-in-part of, and claims the benefit of, U.S. Pat. application Ser. No. 09/167,678, filed Oct. 7, 1998, which is a continuation-in-part of U.S. Pat. application Ser. No. 09/058,640, filed Apr. 10, 1998, now U.S. Pat. No. 5,909,927.

STATEMENT REGARDING FEDERALLY SPONSORED RESEARCH OR DEVELOPMENT

Not Applicable.

BACKGROUND OF THE INVENTION

This invention relates to seat belt restraining systems for vehicles, and more particularly to seat belt restraining systems for airplanes which can be used to selectively secure both an adult, and a child sitting in the lap of the adult.

With the convenience and speed offered by air travel, the popularity of air travel is ever increasing. This is especially true in an age where discount or special low fares are offered to travelers. Obviously, the safety of these passengers is a primary concern of those offering air travel services. One of the safety devices offered is the now well-known seat or lap belt. The seat belt has two straps, at least one of which is adjustable in length. These two straps are connected on one end to the airplane seat. The other end of one of the straps is equipped with a male buckle, and the other end of the remaining strap is equipped with a female buckle. The female buckle typically allows the length of the strap to be adjusted. In normal use, the male buckle is received within the female buckle so that the two straps are coupled together across a passenger's lap. The length of the straps may then be adjusted so that they fit securely across the lap of the passenger. The female buckle typically has a release tab which may be pulled upwardly to release the male buckle from the female buckle, thus separating the two straps and allowing the passenger to move about the cabin.

The above described seat belt works well when only one passenger occupies the seat at any one time. In fact, the seat belt is designed for use by only one passenger at a time. It is, however, becoming increasingly common for people to travel accompanied by infant children. If these children are young enough, an additional ticket is usually not required for the infant. On full flights, in which there are no extra seats available for convenient use by the infant, the adult traveling with the infant will hold the infant in his or her lap. In these situations, the infant will not have the benefit of the above described seat belt. This can be particularly disadvantageous if turbulent air is experienced or if there is some type of airplane accident.

One temptation for overcoming the above drawbacks is to adjust the seat belt to extend across both the adult and the infant. If, however, the infant is restless and it is desired to pass the infant from, for example, a father to a mother, both the mother and the father will be required to unfasten and adjust their respective seat belts. Moreover, the seat belt is not designed to operate across two persons and it is difficult to adjust the seat belt so that it fits securely across both people. In fact, it is currently not legal to employ such a method, and the adult will not be permitted to fasten the existing seat belt around both the adult and another passenger.

Another disadvantage of traveling with children is the lack of safety from a water-landing standpoint. Currently, floatation devices are provided in airplanes that are incorporated in the seat cushions. These devices perform adequately when it is possible to grasp or hold on to the seat cushion. However, it is difficult to hold on to an infant passenger, while at the same time holding on to the seat cushion.

Therefore, a device is needed which overcomes the drawbacks and deficiencies of the existing arrangements discussed above.

BRIEF SUMMARY OF THE INVENTION

Accordingly, it is an object of the present invention to provide an airplane passenger restraint system which can be used to secure both an adult and an infant within a single seat.

Another object of the invention is to provide an airplane passenger restraint system that can be conveniently coupled to the existing seat belt and which can be used to selectively secure both an adult and an infant within a single airplane seat.

A further object of the invention is to provide an airplane passenger restraint system to secure both an adult and an infant, where the restraint system uses components similar to those already in use within the airline industry.

A still further object of the invention is to provide an airplane passenger restraint system to secure both an adult and an infant which is equipped with a padding tube to further increase the comfort of both the adult and the infant.

Yet another object of the invention is to provide an airplane passenger restraint system to secure both an adult and an infant that is constructed to provide a floatation device for the infant in the event of a water-landing.

According to the present invention, the foregoing and other objects are obtained by an airplane passenger restraint system that cooperates with an existing seat belt of an airplane seat where the seat belt has two straps which are releasably coupled together. The existing airline seat is typically equipped with an existing seat belt having a first female buckle end and a first male buckle end. The system includes a second male buckle end for mating connection to the first female buckle end of the seat belt and a second female buckle end for mating and releasable connection to the first male buckle end of the seat belt. A first passenger strap is coupled to the second male buckle end and the second female buckle end and extends therebetween. A second passenger strap is coupled to the second male buckle end and the second female buckle end and also extends therebetween. The system further includes a floatation tube secured around the second passenger strap. In use, the first and second passenger straps may be coupled to the existing seat belt to secure an adult and an infant within the airline seat. The floatation tube provides a floatation device for the infant in the event of a water landing.

Additional objects, advantages, and novel features of the invention will be set forth in part in the description which follows and in part will become apparent to those skilled in the art upon examination of the following, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWINGS

In the accompanying drawings which form a part of the specification:

FIG. 1 is a perspective view of an airline passenger restraint system used to secure an adult and infant within an airplane seat embodying the principles of the present invention;

FIG. 2 is a top view of the restraint system of FIG. 1 taken along line 2—2 of FIG. 1;

FIG. 3 is a partial view of a portion of the restraint system shown in FIG. 1, showing a part of one component of the restraint system being coupled to an existing seat belt;

FIG. 4 is a partial front elevation view showing the male buckle end of the restraint system shown in FIG. 1;

FIG. 5 is a cross sectional view of the male buckle end, taken along line 5—5 of FIG. 4;

FIG. 6 is a partial view of a portion of the restraint system shown in FIG. 1, showing a part of component of the restraint system being coupled to an existing seat belt;

FIG. 7 is a partial front elevation view of the restraint system showing the female buckle end of the restraint system coupled to an existing seat belt;

FIG. 8 is a side elevation view showing the female buckle end of the restraint system coupled to an existing seat belt, with parts being broken away to show particular details of construction;

DETAILED DESCRIPTION OF THE INVENTION

Figure 9:
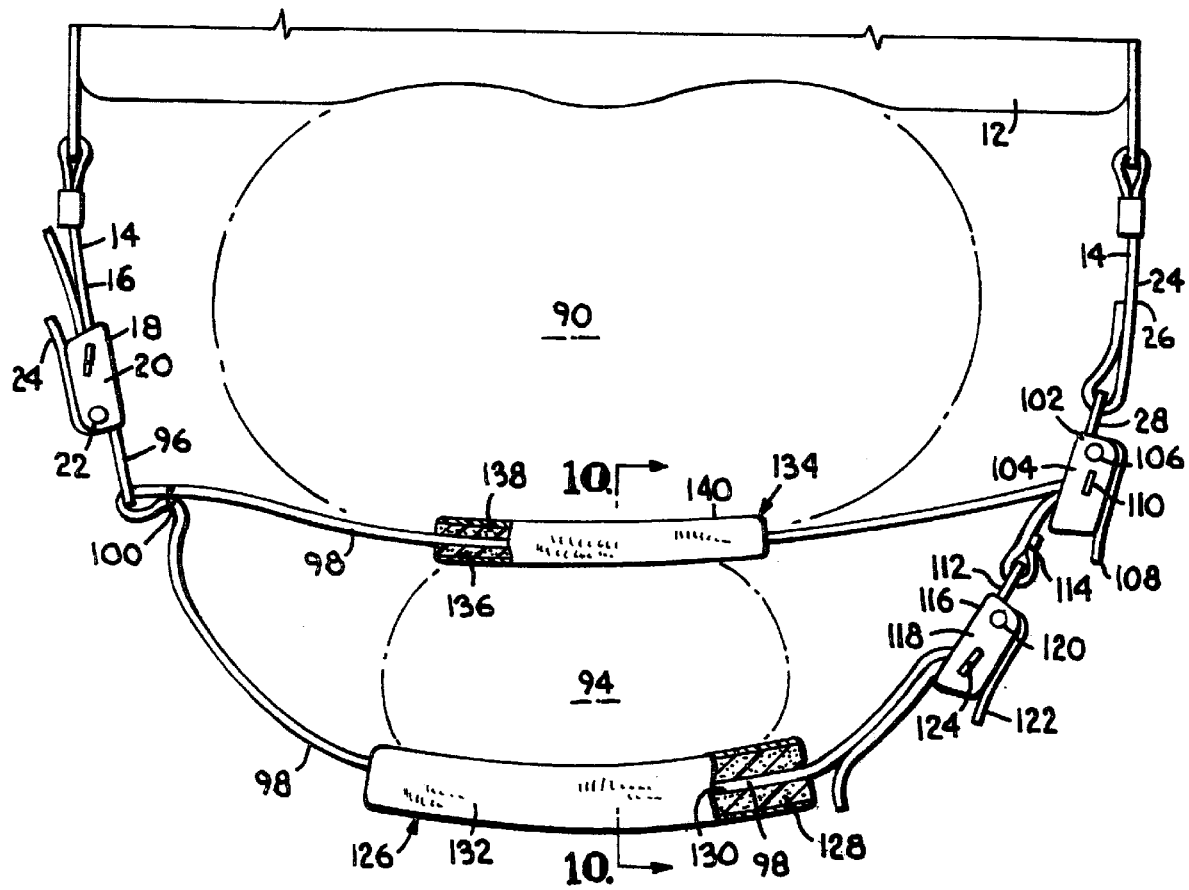
FIG. 9 is a view, similar to FIG. 2, showing an alternate embodiment of the invention.

An airplane passenger restraint system embodying the principles of this invention is broadly designated in the drawings by the reference numeral 10. With initial reference to FIG. 1, the restraint system is used to couple both an adult and an infant within an airplane seat 12. The airplane seat is equipped with a seat belt 14, as is known to those of skill in the art. As best seen in FIG. 2, seat belt 14 has a fabric strap 16 which is coupled on one end to seat 12 and has on its opposite end a female buckle end 18. Female buckle end 18 has a main body 20, a pivot rod 22 and a lift tab 24 which rotates about the pivot rod. Pivot rod 22 operates to couple lift tab 24 to main body 20. Lift tab 24 is biased to a closed position by a spring mechanism, as is known to those of skill in the art. The spring mechanism is coupled to a detent lock, which is pivoted away from main body 20 when lift tab 24 is pulled upwardly, as is known to those of skill in the art. Female buckle end 18 allows the passenger to adjust the length of fabric strap 16 in a conventional manner so that the seat belt is securely across the lap of the passenger.

Seat belt 14 further includes a fabric strap 26 which is coupled on one end to seat 12, on a side opposite the side to which strap 16 is coupled, and has on its opposite end a male buckle end 28. Male buckle end 28 has a cut-out therein that cooperates with the detent lock on female buckle end 18, so that when male buckle end 28 is received within female buckle end 18, the two buckles are secured together, as is known to those of skill in the art. To release male buckle end 28 from female buckle end 18, the passenger can lift upwardly on lift tab 24, which will remove the detent lock from the cut-out in male buckle end 28, uncoupling fabric strap 16 from fabric strap 26, thus allowing the passenger to leave his or her seat. Seat belt 14 is thus in use on existing airplanes to secure a passenger within seat 12.

Restraint system 10 cooperates with the above-described seat belt 14 in existing use and has a first dual strap assembly 30, as best seen in FIGS. 2 and 6 through 8. First assembly 30 has a female buckle end 32 that is similar in many respects to female buckle end 18. Female buckle end 32 has a main body 34, a pivot rod 36 and a lift tab 38 that is coupled to main body 34 via pivot rod 36. Female buckle end 32 has a spring mechanism and detent lock which are constructed as are the spring mechanism and detent lock on existing female buckle end 18. Female buckle end 32 can thus matingly receive male buckle end 28 of existing seat belt 14. Female buckle end 32 operates similarly to female buckle end 18 so that male buckle end 28 may be secured within female buckle end 32, and may be released by pulling upwardly on lift tab 38. Preferably, female buckle end 32 is made of the same material as female buckle end 18, which is known to those of skill in the art.

As best seen in FIGS. 6 and 7, main body 34 of female buckle end 32 has a pair of through holes 40 on each side thereof which are used to secure a first roller 42 and a second roller 44 within main body 34. In the prior art seat belt, only one roller is secured within the main body. In the present invention, first roller 42 acts as an anchor for a first section 46 of a first passenger strap 48. Main body 34 has a slot 50 therein which allows first section 46 to be disposed through slot 50 and around roller 42. First section 46 is a fabric strap and is preferably made from the same material that is used for fabric straps 16 and 26. Secured to first section 46 opposite roller 42 is a male buckle end 52. Male buckle end 52 is preferably constructed of the same material and to the same specifications as is prior art male buckle end 28. Male buckle end 52 thus has a strap passage 53, through which the fabric of first section 46 is passed. After being passed through passage 53, the fabric of first section 46, is stitched together in the form of a loop to couple male buckle end 52 to first section 46. Male buckle end 52 further has a cut-out therein, as in the prior art male buckle end 28.

Second roller 44 acts as an anchor for a first section 54 of a second passenger strap 56. First section 54 is preferably made from the same fabric that is used for straps 16 and 26. To accommodate the buckling of second passenger strap 56, first section 54 of second passenger strap 56 may be longer than first section 46 of first passenger strap 48. Main body 34 has a second slot 58 therein which allows first section 54 to be disposed through the slot and around roller 44. Secured to first section 54 opposite roller 44 is a male buckle end 60 that is similar in construction to male buckle end 52 and which is coupled to first section 54 in the same manner as male buckle end 52 is coupled to first section 46.

First dual strap assembly 30 can thus be coupled to fabric strap 26 and male buckle end 28 via female buckle end 32. Through the provision of strap assembly 30, restraint system 10 converts the seat belt 14 from one having only a single male buckle end to a dual male buckle end assembly.

Restraint system 10 further includes a second dual strap assembly 62, as best seen in FIGS. 2–5, that cooperates with first dual strap assembly 30, as more fully described below. Second dual strap assembly 62 has a male buckle end 64 which is preferably constructed of the same material as male buckle ends 28, 52 and 60. Male buckle end 64 is equipped with a fastening end 66 that has a cut-out 68 formed therein. Fastening end 66 is thus similar in construction to that of male buckle end 28. Fastening end 66 and cut-out 68 are constructed to be received within female buckle end 18. More specifically, the detent lock on female buckle end 18 will cooperate with cut-out 68 to couple female buckle end 18 to male buckle end 64. As best seen in FIG. 4, male buckle end 64 further has a strap end 70 that differs from that on male buckle end 28 in that a forward strap passage 72 and a rearward strap passage 74 are provided therein. As discussed above, male buckle end 28 has only a single strap passage 53 formed therein. Passages 72 and 74 allow a pair of straps to be coupled to male buckle end 64, rather than just a single strap.

Male buckle end 64 is coupled to a second section 76 of first passenger strap 48 and to a second section 78 of second passenger strap 56. As best seen in FIG. 5, the fabric of second section 76 is passed through forward strap passage 72 and then back through rearward strap passage 74. The fabric is stitched together to secure second section 76 to male buckle end 64. Similarly, the fabric of second section 78 is passed through rearward strap passage 74 and is brought back around male buckle end 64. The fabric is then stitched together to secure second section 78 to male buckle end 64. Male buckle end 64 thus has two straps extending therefrom, namely second section 76 and second section 78.

As best seen in FIGS. 2 and 6, second section 76 of first passenger strap 48 has a female buckle end 80 on the end opposite male buckle end 64. Female buckle end 80 is preferably constructed just as female buckle end 18 is constructed and has a main body 82, a lift tab 84, and a pivot rod 86 which secures lift tab 84 to main body 82. A spring mechanism and detent lock are provided, as in existing female buckle end 18. Female buckle end 80 further has a strap roller mechanism 88 which allows second section 76 of first passenger strap 48 to be adjusted in length, as is known to those of skill in the art. Female buckle end 80 can thus receive male buckle end 52, thus securing first section 46 and second section 76 of first passenger strap 48 to one another. As shown in FIGS. 1 and 2, first passenger strap 48 can be fastened securely and low across the adult passenger 90's pelvis.

Second section 78 of second passenger strap 56 similarly has a female buckle end 92 on the end opposite male buckle end 64. Female buckle end 92 is similar in all respects to female buckle ends 18 and 80, in that main body 82, lift tab 84 and pivot rod 86 are present. Similarly, female buckle end 92 will have a spring mechanism and detent lock, as well as a strap roller mechanism 88. Female buckle end 92 can thus receive male buckle end 60, thus securing first section 54 and second section 78 of second passenger strap 56 to one another. As shown in FIGS. 1 and 2, second passenger strap 56 can be fastened around or across an infant passenger 94.

As best seen in FIG. 1, restraint system 10 can include a padding tube 95 which can be placed around passenger straps 48 and 56 to increase the comfort of both the adult and the infant.

In use, restraint system 10 will be coupled to the existing seat belt 14. More specifically, first dual strap assembly 30 is coupled to male buckle end 28 of the existing seat belt. This is done by inserting male buckle end 28 into female buckle end 32. Thereafter, second dual strap assembly 62 is coupled to the existing seat belt 14. This is done by inserting male buckle end 64 into the existing female buckle end 18 of seat belt 14. At this point, the adult passenger may be secured within seat 12, and may secure himself or herself within the seat by coupling male buckle end 52 within female buckle end 80. Thereafter, the adult may adjust second section 76 of first passenger strap 48 in length so that it fits securely and low across the adult's pelvis. Thereafter, the adult may position the infant in his or her lap and secure the infant with second passenger strap 56. This is done by coupling male buckle end 60 within female buckle end 92. The adult may thereafter adjust the length of second section 78 so that second passenger strap 56 is securely across the infant.

It can thus be seen that restraint system 10 can be coupled to existing seat belt 14 to selectively secure both an adult and an infant within an airplane seat. Restraint system 10 uses components and materials which are the same or similar to those currently in use, and is a convenient device to secure an infant and an adult within an airplane seat.

An alternative embodiment of the present invention is shown in FIG. 9. In this embodiment, the restraint system is again used to couple both an adult and an infant within an airplane seat 12. As above, the airplane seat is equipped with a seat belt 14, which has a fabric strap 16 coupled on one end to seat 12, and which has on its opposite end a female buckle end 18. Female buckle end 18 has a main body 20, a pivot rod 22 and a lift tab 24 which rotates about the pivot rod. Seat belt 14 further includes a fabric strap 26 which is coupled on one end to seat 12, on a side opposite the side to which strap 16 is coupled, and has on its opposite end a male buckle end 28. In this embodiment, restraint system 10 includes a male buckle end 96, which is similar in all respects to end 28. End 96 has a fabric strap 98 coupled thereto. Strap 98 may be coupled to end 96, such as, for example, looping strap 98 through an opening in end 96 and stitching strap 98 together, such as is shown at 100 in FIG. 9.

One end of strap 98 extends from end 96 and is passed through a female buckle end 102. End 102 is similar in all respects to female buckle end 18. Thus, end 102 has a main body 104, a pivot rod 106 and a lift tab 108. Strap 98 is passed around a strap rod 110, as is shown in FIG. 9. After passing through female end 102, an end of strap 98 is looped through a male buckle end 112 and is stitched together, as at 114. End 112 is similar in all respects to male end 28.

The other end of strap 98 extends from end 96 and is passed through a female buckle end 116, which is similar in all respects to ends 102 and 18. End 116 thus has a main body 118, a pivot rod 120 and a lift tab 122. Strap 98 is passed around a strap rod 124, as is shown in FIG. 9. Strap rod 124 allows the length of this end of strap 98 to be adjusted in length. Ends 112 and 116 allow the strap 98 used for a second passenger to be releasably coupled and uncoupled. If it is not desired to couple and uncouple the second passenger portion of strap 98, ends 116 and 112 can be eliminated. This, however, also limits the adjustability of the second passenger portion of strap 98.

Figure 10:
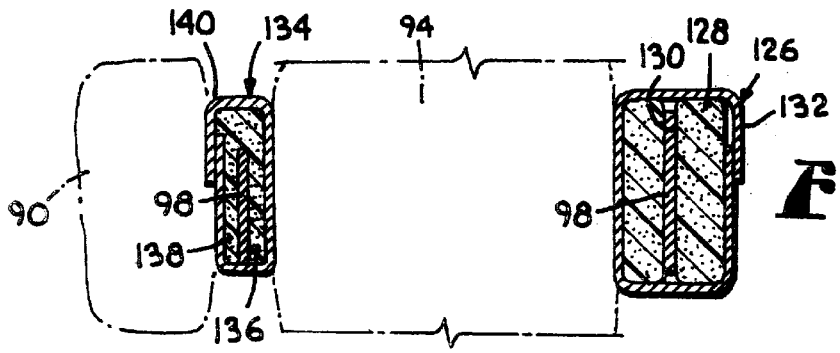
FIG. 10 is a cross-sectional view, taken along line 10—10 in FIG. 9, showing the floatation pad.

As best seen in FIGS. 9 and 10, a floatation tube 126 is coupled around the second passenger portion of strap 98. Tube 126 thus operates somewhat similarly to tube 95. In this embodiment, however, tube 126 has a floatation core 128 that offers both padding and floatation capabilities. Core 128 can be made from any of a number of materials offering a sufficient buoyancy, such as a styrofoam material. Core 128 has a slot 130 cut therein to receive strap 98, as best seen in FIG. 10. Surrounding core 128 is a fabric cover 132 that is equipped with a fastening device, such as a hook and loop fastener strip, that functions to close cover 132 about strap 98, holding strap 98 within slot 130. Tube 126 can be any of a number of shapes, such cylindrical, or a more rectangular form as shown in FIG. 10.

The portion of strap 98 extending across first passenger 90 and behind second passenger 94 has a floatation ballast 134 coupled thereto. Ballast 134 is made from a buoyant material, such as styrofoam and has a front portion 136 and a back portion 138. Sandwiched between portions 136 and 138 is the first passenger portion of strap 98. Ballast 134 has an outer fabric cover 140 that couples portion 136 and 138 together and about strap 98, using a fastener such as a hook and loop material. Ballast 134 cooperates with tube 126 to provide a floatation system for an infant in the event of a water landing. Preferably, tube 126 offers more buoyancy than ballast 134. Because tube 126 is positioned in front of passenger 94, it will act to tilt the passenger rearwardly if the passenger is in a body of water.

In using this embodiment, end 96 is coupled to end 18. Thereafter, passenger 90 secures strap 98 in place by connecting end 102 with end 28. Female end 18 allows the length of strap 98 to be adjusted properly. Passenger 90 can then secure the remaining portion of strap 98 around passenger 94 by securing end 116 to end 112. End 116 allows the length of the strap to be adjusted properly. When used as a floatation device, buckle 102 is released from buckle 28, and buckle 96 is released from buckle 18, leaving ballast 134 and tube 126 adjacent the infant passenger 94.

From the foregoing, it will be seen that this invention is one well adapted to obtain all of the ends and objects hereinabove set forth, together with other advantages which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus claimed the invention, what is claimed is:

1. An airline passenger restraint system capable of securing an adult and an infant within an airline seat that is equipped with an existing seat belt having a first female buckle end and a first male buckle end, comprising:

a second male buckle end for mating connection to the first female buckle end of the seat belt;

a second female buckle end for mating and releasable connection to the first male buckle end of the seat belt;

a first passenger strap coupled to said second male buckle end and said second female buckle end and extending therebetween;

a second passenger strap coupled to said second male buckle end and said second female buckle end and extending therebetween; and a floatation tube secured around said second passenger strap, wherein said first and second passenger straps may be coupled to the existing seat belt to secure an adult and an infant within the airline seat, and wherein said floatation tube provides a floatation device for the infant in the event of a water landing.

2. The airline passenger restraint system of claim 1, further comprising a floatation ballast secured around said first passenger strap, said ballast providing a further floatation device for the infant in the event of a water landing.

3. The airline passenger restraint system of claim 2, wherein said second passenger strap includes a third male buckle end and a third female buckle end, said third male and female buckle ends providing a releasable connection for said second passenger strap.

4. The airline passenger restraint system of claim 3, wherein said third female buckle end has a roller that allows the length of the second passenger strap to be adjusted.

5. The airline passenger restraint system of claim 1, wherein said first passenger strap and said second passenger strap are both formed from a single piece of strap fabric.

6. An airline passenger restraint system capable of securing an adult and an infant within an airline seat that is equipped with an existing seat belt having a first female buckle end and a first male buckle end, comprising:

a second male buckle end for mating connection to the first female buckle end of the seat belt;

a first passenger strap coupled to said second male buckle end and extending therefrom;

a second passenger strap coupled to said second male buckle end and extending therefrom;

a first attaching mechanism coupled to said first passenger strap distal from said second male buckle end for mating and releasable connection to the first male buckle end of the seat belt;

a second attaching mechanism coupled to said second passenger strap distal from said second male buckle end for mating and releasable connection to said first attaching mechanism; and a floatation tube secured around said second passenger strap, wherein said first and second passenger straps may be coupled to the existing seat belt to secure an adult and an infant within the airline seat, and wherein said floatation tube provides a floatation device for the infant in the event of a water landing.

7. The airline passenger restraint system of claim 6, further comprising a floatation ballast secured around said first passenger strap, said ballast providing a further floatation device for the infant in the event of a water landing.

8. The airline passenger restraint system of claim 7, wherein said first attaching mechanism is a second female buckle end and wherein said first passenger strap extends through said second female buckle end.

9. The airline passenger restraint system of claim 8, wherein said second attaching mechanism is a third female buckle end and wherein said first passenger strap has a third male buckle end coupled thereto on an end distal from said second male buckle end and adjacent said second female buckle end.

10. The airline passenger restraint system of claim 9, wherein said first and second passenger straps are both formed from a single piece of strap fabric.

* * * * *